United States Patent [19]
White

[11] 3,872,626
[45] Mar. 25, 1975

[54] GRINDING MACHINE WITH TILTING TABLE

[75] Inventor: Philip H. White, Claremont, N.H.

[73] Assignee: Cone-Blanchard Machine Company, Windsor, Vt.

[22] Filed: May 2, 1973

[21] Appl. No.: 356,418

[52] U.S. Cl. ................................ 51/129, 51/240 A
[51] Int. Cl. ..................... B24b 5/04, B24b 41/02
[58] Field of Search ............ 51/118, 129, 131, 133, 51/134, 240 A; 90/21

[56] References Cited
UNITED STATES PATENTS

| | | | |
|---|---|---|---|
| 159,518 | 2/1875 | Laurent | 51/240 A X |
| 184,933 | 11/1876 | Vogeley | 51/240 A |
| 742,356 | 10/1903 | Roberts | 90/21 |

FOREIGN PATENTS OR APPLICATIONS

| 644,253 | 7/1962 | Canada | 51/134 |
|---|---|---|---|

*Primary Examiner*—Al Lawrence Smith
*Assistant Examiner*—Marc R. Davidson
*Attorney, Agent, or Firm*—Kenway & Jenny

[57] ABSTRACT

A grinding machine of the vertical spindle, rotary chuck, sliding table type introduces a selective offset between the normally precisely-aligned orientation of the table relative to the grinding axis by lifting the table from one way for rotation on the other way about a fixed center of rotation.

3 Claims, 4 Drawing Figures

3,872,626

GRINDING MACHINE WITH TILTING TABLE

BACKGROUND

This invention relates to grinding machines, and provides an improvement for setting up the machine to perform rough grinding with high metal removal rates and for then returning to the exacting setup required for precise finish grinding.

The invention applies to grinding machines of the type having a normally horizontal, workpiece-carrying rotary table slidable on ways between a load position and a grind position. The table typically has a rotating work-holding chuck, on which the workpieces are held by clamps or by magnetism, and which provides the table surface. The grinding tool of the machine is carried on a vertical spindle, and typically is mounted by way of slides for movement up and down above the table surface.

To perform accurate and precise finish grinding with a machine of this type, the table surface is aligned exactly perpendicular to the grinding-tool spindle axis. However, faster stock removal can be achieved in rough grinding when the table surface is slightly offset or tilted relative to the spindle.

Prior art mechanisms for attaining the two different setups desired for finish grinding and for rough grinding have encountered problems in returning the machine to the exact setup required for precise finish grinding without adjustments and recalibration. It has also been a problem to provide a firm, solid support in both setups for both the workpiece table and for the grinding-tool spindle.

One prior art grinding machine which endeavors to provide the foregoing operation is disclosed in U.S. Pat. No. 2,998,679. The machine of this patent mounts the grindingtool spindle to the vertical slides by means of a pivot mechanism separate from, and in addition to, the interconnections required in a conventional grinding machine.

It is an object of this invention to provide a grinding machine mechanism for introducing a selective alignment offset, i.e. an offset between the grinding-tool spindle and the workpiece table, without the introduction of joints, interfaces or interconnections beyond those found in conventional grinding machines.

Another object of the invention is to provide a grinding machine offset mechanism which provides a fixed, automatic return to the precise alignment for finish grinding.

A further object of the invention is to provide a grinding machine offset mechanism which provides firm, solid support for the grinding tool spindle and for the workpiece supporting table in both the finish grinding setup and in the rough grinding setup.

Another object of the invention is to provide a grinding machine offset mechanism which enables rough-cut grinding to at least the same rough-cut tolerances as prior machines.

It is also an object of the invention to provide a grinding machine having the foregoing features and which is of relatively low cost and yet of high reliability.

Other objects of the invention will in part be obvious and will in part appear hereinafter.

SUMMARY OF THE INVENTION

In brief, a grinding machine embodying the invention has means for lifting the table from one of two parallel ways so that it pivots on the other way and thereby tilts upward relative to the vertical grinding-tool spindle. The tablelifting means can, for example, employ a lead screw, a cam, a wedge, an hydraulic piston, or any like jacking or lifting device. Whatever construction is used, however, a continuously-operating lift mechanism is desired to provide a continuous range of offsets for different rough grinding conditions.

In the operation of a grinding machine employing the invention, the lift mechanism is retracted when the table is moved along the ways between the grind location and the load location, and during finish grinding. Accordingly, at these times, the table rests directly on both ways, and has the resultant precise alignment of conventional machines.

However, to rough cut workpieces, the workpieces are loaded onto the table, and the table moved to the grind location, after which the lift mechanism is operated to raise the table from one way. This tilts the table to provide the desired offset between the table surface and the grinding-tool axis. Upon completion of the rough grinding, the lift mechanism is again retracted. The table then automatically returns to the precise finish-grinding alignment, without any re-alignment or further adjustment.

It should be noted that the left mechanism is retracted prior to movement of the table, so that the table always slides on the ways in the conventional manner.

A further and separate feature of the invention is that the way on which the table tilts preferably engages the table with a rounded pivot surface such that the table rotates on that way about a fixed center of rotation.

Thus, with the construction provided by the invention, a grinding machine can be set up for performing finish grinding simply by retracting the table-lifting mechanism, so that the table rests directly on the ways. The grinding-tool spindle is then aligned with the work-carrying table in the normal manner with as much accuracy and precision as the grinding machine would conventionally provide. However, the grinding machine is quickly set up for rough-cut grinding simply by raising the lift mechanism after the workpiece-carrying table moves to the grind location. Also, the amount of tilt or offset is readily controlled simply by controlling the extension of the lift mechanism.

The invention thus provides for efficient rough-cut grinding without introducing any joints, interconnections or engaging surfaces other than those required in a conventional prior art grinding machine. That is, the invention provides a mechanism for introducing an alignment offset at the location of an already-existing interface between separate parts of the grinding machine. This feature enables the invention to be practiced with only a relatively small increase in the cost of the grinding machine, as compared with prior art grinding machines. More important, it enables the grinding machine to have the same firm solid structure and the high-precision alignment for finish grinding, as it would have without the table-inclining mechanism.

BRIEF DESCRIPTION OF DRAWINGS

For a fuller understanding of the nature and objects of the invention, reference should be made to the following detailed description and the accompanying drawings, in which.

DESCRIPTION OF ILLUSTRATED EMBODIMENTS

Figure 1:
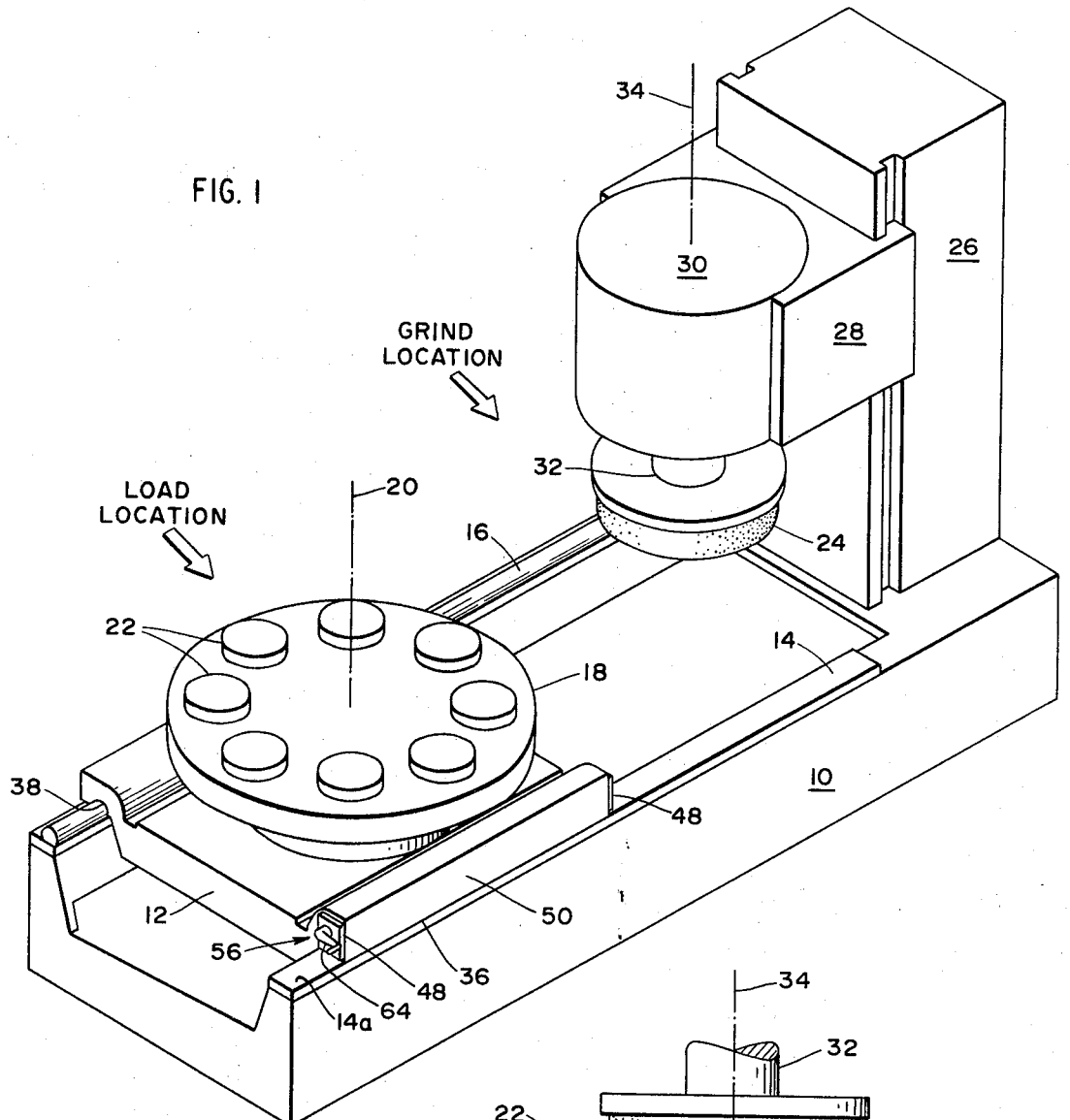
FIG. 1 is a perspective view of a grinding machine embodying the invention.

FIG. 1 shows a simplified view of a vertical-spindle, sliding-table grinding machine. By way of illustration, conventional machines of this type, an example of which are the Series 20 and 22 Grinders manufactured by the Cone-Blanchard Machine Company, can grind surfaces to a finish of one microinch and a flatness within 0.000010 inch. As is conventional in such grinding machines, the illustrated machine has a base 10 that carries a workpiece table 12 on a pair of horizontal ways 14 and 16. The illustrated table 12 carries a magnetic chuck 18 arranged for powered rotation relative to the table about a chuck axis 20. The table 12 is slidably movable on the ways between a load location, as shown, where workpieces 22 can be loaded, and a grind location where the chuck is under a grinding tool 24.

The base 10 has an upstanding column 26 on which a head 28 is mounted for powered movement up and down relative to the column. A motor 30 mounted on the head rotates a spindle 32, which carries the grinding tool 24, about a vertical spindle axis 34.

The ways 14 and 16 on the grinding machine base 10 engage slide surfaces 36 and 38 respectively on the table 12, and these ways and associated slide surfaces support the table with the chuck axis 20 exactly parallel to the spindle axis 34 at all positions of the table along the ways. This alignment is desired for finish grinding, i.e., for grinding surfaces of workpieces 22 on the chuck 18 of the table to the desired final tolerance and finish.

Figure 2:
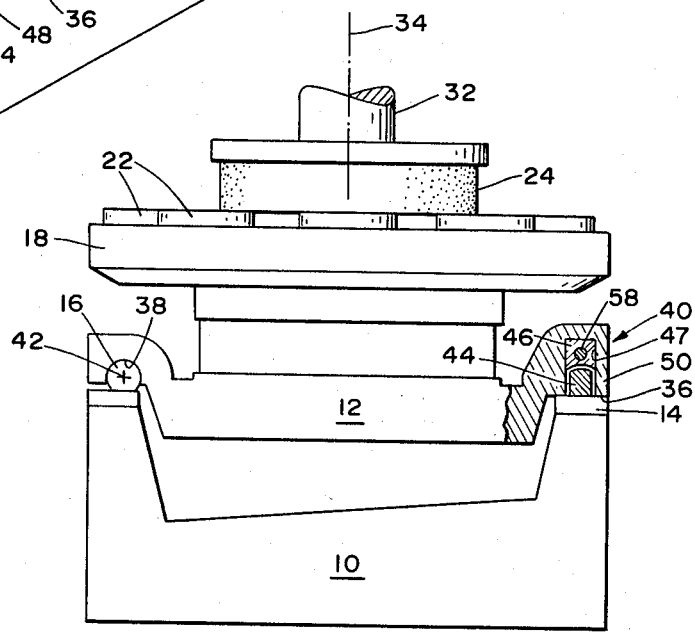
FIG. 2 is a fragmentary side elevation view, partly broken away, of the grinding machine of FIG. 1 viewed from the left side thereof.

As FIGS. 1 and 2 further illustrate, the front way 14 has a conventional flat slide surface 14a that normally bears against the slide surface 36 on the underside of the table 12. The rear way 16, however, is rounded to have a circular cross section, as shown in FIG. 2. The associated slide surface 38 on table 12 is similarly rounded to mate with the way 16, on which it seats.

Figure 3:
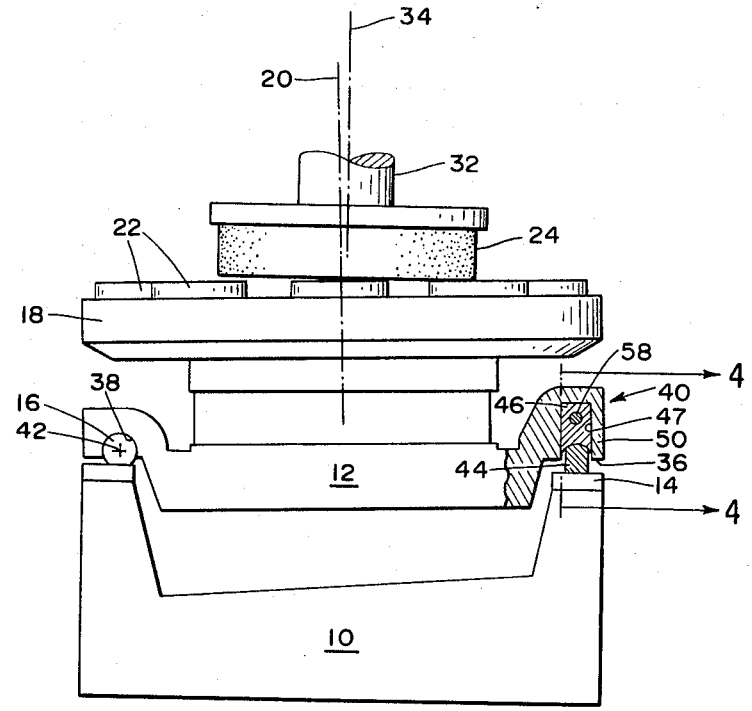
FIG. 3 is a view similar to FIG. 2, except with the workpiece table inclined to provide a rough-cut alignment offset.

FIG. 3 shows the table 12 in the grind location (FIG. 1) and inclined from the above-noted finish position so that the chuck axis 20 is slightly offset from the spindle axis 34. As discussed above, this offset is desirable for performing rough grinding. A lift mechanism 40 provides this incline of the table 12.

The illustrated lift mechanism is carried on the table 12 and engages the front way 14 to lift the table from the front way. This lifting action rotates the table upward on the rear way. The rounded surface of the rear way 16 and its associated matingly-rounded slide surface 38 cause the rotation of the table to be about a center of rotation 42 that is fixed in that it does not change with the extent of inclination.

Figure 4:
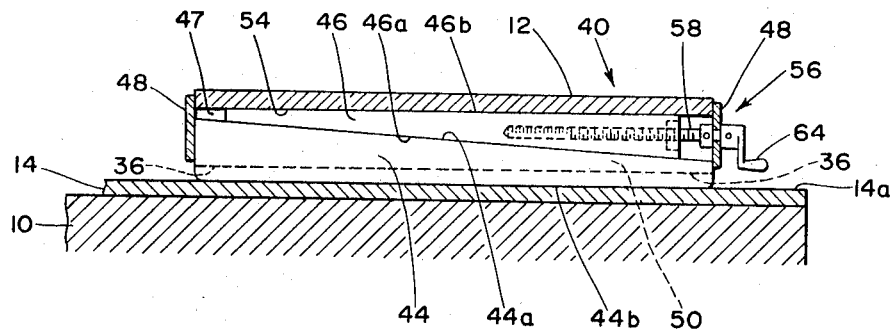
FIG. 4 is a fragmentary sectional view taken along line 4—4 of FIG. 3.

As shown in FIGS. 3 and 4, the lift mechanism 40 illustrated employs a pair of wedge-like camming members 44 and 46 in a face-to-face sliding abutment along their inclined cam surfaces 44a, 46a. The camming members are seated in a slot 47 in the table to maintain them in register one above the other, and aligned above the front way 14. Restraining blocks 48 secured to the table 12 at the ends of slot 47 restrain the lower cam member 44 from movement along the ways. Hence, the lower cam member is free only for vertical sliding movement, i.e. movement parallel to the chuck axis 20. The cam member 44 has a lower-bearing surface 44b in register with and above the way 14 so that when the cam member is urged downward, this surface bears against the way to lift the table slide surface 36 upward off the way. The cam member 44 is thus mounted to the table 12 in a manner that maintains the lower surface 44b parallel to the way 14, and the camming surface 44a is inclined relative thereto.

The upper cam member 46, also seated in the table slot 47, has a horizontal upper, bearing surface 46b in sliding engagement with a downwardly-facing slide shelf 54 on the table 12. The cam surface 46a is inclined relative to the surface 46b to be parallel to the surface 44a of the lower cam member 44, as shown. That is, the two cam members 44 and 46 have equal angles between their camming and bearing surfaces.

The inclined cam surfaces 44a and 46a additionally are rounded, in the plane of FIG. 3 as shown there. The purpose of these mating curvatures is to seat the upper member 46 fully on the lower member 44 throughout the lifting of the table from the way 14 with the resultant angular misalignment between that way and the upper cam member.

With further reference to FIGS. 3 and 4, the lift mechanism 40 includes a drive mechanism 56 illustrated as a lead screw 58 carried with the table 12 and threadedly engaged with the upper cam member 46 to move that cam member as the lead screw rotates. In particular, the illustrated lead screw is journaled to one restraining block 48. The drive mechanism 56 is illustrated as being manually operated by means of a crank 64 on the lead screw. However, it will be apparent that the lead screw can either alternatively or in addition be powered, as by an electric motor, for automatic operation. With either a manual or a powered arrangement, the illustrated sliding cam construction of the lift mechanism provides a continuous operation in that the table can be lifted from the front way 14 by any desired spacing, within the maximum extension of the lift mechanism. Typically only a small offset is desired; for example, with the table being lifted from the front way 14 by 1/1000 inch per inch of diameter of the wheel-like grinding tool 24, which is one machine inclines the chuck axis 20 by 4 minutes of arc relative to the spindle axis 34. In this regard, the inclination shown in FIGS. 3 and 4 is exaggerated for clarity of illustration.

With the foregoing grinding machine construction, the lift mechanism normally is withdrawn or retracted so that the table rests entirely on the two ways 14 and 16, as in FIGS. 1 and 2. The grinding machine is in this condition throughout the traverse of the table along the ways and during finish grinding. The weight of the table is sufficient to keep it flat on the ways, i.e. is sufficient to return the lower cam member 44 to a retracted position (FIG. 2) so that it does not interfere with the table slide surface 36 resting fully on the way 14. If desired, however, those skilled in the art of mechanical movements can provide a mechanism for the positive retraction of the lower cam member.

When the lift mechanism is to be used, it is first maintained in the withdrawn and retracted condition while the workpieces which are to be rough ground are loaded on the chuck, after which the table is moved along the ways to the desired grind location. The lift mechanism is then extended to the condition shown in FIGS. 3 and 4 by turning the lead screw 58 to cam the lower cam member 44 downward and thereby tilt the table by the amount desired. It should be noted that the lift mechanism can be extended, and the table tilted, with the table in any position along the ways.

The lift mechanism is maintained in the extended position, and the table maintained stationary in the specified grind location, throughout the rough grinding operation. However, rough grinding can be done in stages with, first, one grinding tool operating with one degree of table inclination, and then with a second, different grinding tool and the table having a second, typically smaller, inclination to grind the workpieces closer to the finish dimension.

Upon completion of the rough grinding operation, the lift mechanism is retracted, allowing the table to again rest fully on the front way. The table then is automatically again aligned, with the chuck axis exactly parallel to the spindle axis, for finish grinding.

In the illustrated embodiment of the invention described above, the front way 14 serves both as a slide surface and as a lift surface, in that the lift mechanism 40 bears against it. The invention can, of course, be practiced with a lift surface provided on the grinding machine base separate from either way. It is generally preferable, however, that whatever lift surface is provided allows the table to be inclined at any grind location along the ways.

It should also be understood that the invention can be practiced with lift mechanism constructions other than the camming wedge-type mechanism illustrated. For example, a direct acting lead screw or an hydraulic lift mechanism can be employed, as well as any one of a variety of other constructions. It is considered preferable, however, that the lift mechanism be carried on the table 12.

Also, although considered preferable, the invention does not require a rounded pivoting way. Other structures, in the lift mechanism and/or in the way on which the table tilts, can be provided to preclude movement of the tilted table sideways of the ways.

It will thus be seen that the objects set forth above, among those made apparent from the preceding description, are efficiently attained. Since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. Machine tool apparatus for grinding a workpiece and having a base, first and second spaced apart and parallel rail-like slide means on said base, and table means for supporting said workpiece on a surface normally exactly transverse to a first axis and supported on said slide means for movement between a load location and a grind location, said apparatus further comprising a rounded slide surface on said second slide means, a correspondingly rounded slide surface on said table means slidably and pivotably seated on said second slide means, with the roundnesses of said engaged surface being configured for rotation of said table means, and retractable lifting means for engaging and selectively lifting said table means from said first slide means at said grind location, thereby to rotate said table means upward about said second slide means and to offset said table surface selectively from said first axis.

2. A grinding machine of the vertical spindle and sliding table type having a base, first and second ways on said base, a table slidable along siad ways between first and second locations with a workpiece-receiving surface perpendicular to a first axis, and a grinding-tool spindle on said base above said table and rotatable about said first axis and carrying a grinding tool into engagement with a workpiece on said table surface, and further comprising a rounded surface on said second way slidably engaged with said table means for rotation thereof about a fixed rotation axis extending parallel to said ways and lift means including first and second wedge members each having a camming surface opposite and inclined relative to a bearing surface, said inclinations being the same, said wedge members being carried by said table one above the other with said camming surface in face-to-face abutment and said bearing surface extending parallel to said ways, said first wedge member being movable relative to said table only along said first axis and between an extended position where it bears against said base to effect lift of said table and a retracted position, said second wedge member being movable relative to said table only parallel to said ways for moving said first wedge member between said positions thereof and drive means for selectively moving said second wedge member in a direction parallel to said ways.

3. A grinding machine as defined in claim 2 further characterized in that said drive means includes a lead screw threadably engaged with said second wedge member to provide said selective movement thereof.

* * * * *